United States Patent [19]
Halls

[11] Patent Number: 6,091,400
[45] Date of Patent: *Jul. 18, 2000

[54] PIXEL CONVERSION BETWEEN DIFFERENT COLOR DEPTHS

[75] Inventor: Jerry R. Halls, Provo, Utah

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/907,534

[22] Filed: Aug. 8, 1997

[51] Int. Cl.⁷ ...................................... G09G 5/02
[52] U.S. Cl. ................ 345/150; 345/153; 345/155; 345/431; 345/199; 345/1
[58] Field of Search ................... 345/150, 431, 345/153, 155, 186, 426, 507, 154, 1, 2, 199; 382/167, 518; 395/109

[56] References Cited

U.S. PATENT DOCUMENTS

| | | | |
|---|---|---|---|
| 5,642,137 | 6/1997 | Kitazumi | 345/199 |
| 5,696,539 | 12/1997 | Welti et al. | 345/199 |
| 5,774,126 | 6/1998 | Chatterjee et al. | 345/431 |

*Primary Examiner*—Richard A. Hjerpe
*Assistant Examiner*—Francis Nguyen
*Attorney, Agent, or Firm*—Blakely, Sokoloff, Taylor & Zafman LLP

[57] ABSTRACT

At least one pixel conversion table is provided for converting pixels between different color depths. Each pixel conversion table comprises a plurality of conversion entries mapping colors of one color depth to colors of another color depth. An application accesses the provided at least one pixel conversion table to effectuate any necessary conversion during operation.

18 Claims, 5 Drawing Sheets

| INPUT | OUTPUT |
|---|---|
| 16 BIT RGB | 8 BIT INDEX |
| | |
| ⋮ | ⋮ |
| | |

| INPUT | OUTPUT |
|---|---|
| 8 BIT INDEX | 4 BIT INDEX |
| | |
| ⋮ | ⋮ |
| | |

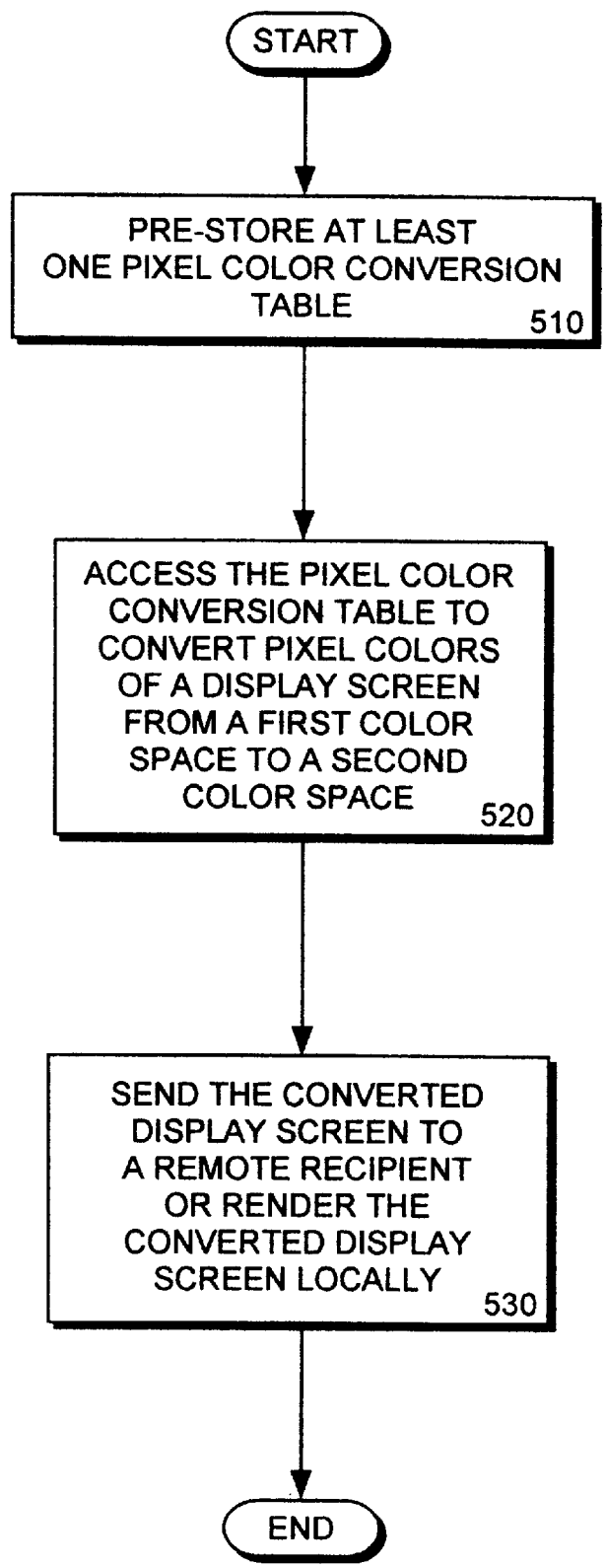

PIXEL CONVERSION BETWEEN DIFFERENT COLOR DEPTHS

BACKGROUND OF THE INVENTION

1. Field of the Invention

The present invention relates to the field of computer systems. More specifically, the present invention relates to methodology for converting pixels between different color depths, and its applications, including apparatuses incorporated with such methodology.

2. Background Information

A pixel value directly or indirectly denotes a color, or more specifically, a particular shade of the color, to be rendered on a display for a picture element (pixel). The former is referred to as a direct color pixel, whereas the latter is referred to as an indexed color pixel. A direct color pixel explicitly specifies the RGB information of the color, whereas an indexed color pixel implicitly specifies the RGB information by indexing a RGB color entry in a color table. The number of colors available in a color space depends on the number of bits employed, which is referred to as the color depth. For example, a 16-bit direct color pixel may specify a color formed from any one of 32 levels of intensity of R, G, as well as B, employing 5 bits each for R, G, and B (1 unused bit), whereas an 8-bit indexed color pixel may specify any one of 256 colors. Typically, direct color pixels are either 16 or 32 bits, whereas indexed color pixels are 1, 2, 4 or 8 bits (1 bit=black/white, 2 bits=4 shades of grey). The color depth employed is application dependent, depending on the hardware and/or software of a particular situation.

Thus, for applications or equipment designed to operate with different color depths to work together, it is necessary to convert the pixels from one color depth to another color depth. Note that when conversion is needed, it is not just for one or two pixels, each pixel of each display screen has to be converted. Typically, the conversion is performed by finding the closest color using the Euclidean Distance Formula, i.e. min distance=square root $[(R1-R2)^2+(G1-G2)^2+(B1-B2)^2]$, where (R1,G1,B1) and (R2, G2,B2) are the RGB values of the pixel in the two color spaces. Today, most operating systems include pixel conversion service for converting pixels between different color depths, among the system services offered, and provide an API for applications to invoke such service in real time.

Over the last decade, the price/performance of color monitors has dramatically improved, resulting in color monitors virtually replacing monochrome monitors as standard equipment, except perhaps in the case of system consoles and the like. Moreover, pixel resolution has increased substantially. For example, it is no longer uncommon to find equipment/application operating with a 1,024× 768 pixel resolution, i.e. 1,024×768 pixels per display screen. In turn, more applications are exploiting colors to enhance end user experience, that is greater color depths are being employed. At the same time, as networking and communication technology continues to advance, more and more computer systems from different manufacturers are interconnected together. As a result, the frequency of situations requiring pixel conversion between different color depths arising has increased dramatically. The prior art approach of invoking an operating system service to convert pixel from one color depth to another color depth in real time, employing the Euclidean Distance Formula, has become too computational intensive, and therefore unacceptably slow. Moreover, in a number of situations, the need for pixel conversion from one color depth to another color depth arises at interrupt time, e.g. remote control service applications, and for certain operating systems, e.g. MacOS available from Apple Computer of Cupertino, Calif., the pixel conversion service between different color depths cannot be invoked through the API, when servicing an interrupt. Thus, an improved approach to converting pixels from one color depth to another color depth in real time is desired.

SUMMARY OF THE INVENTION

At least one pixel conversion table is provided for converting pixels between different color depths. Each pixel conversion table comprises a plurality of conversion entries mapping colors of one color depth to colors of another color depth. An application accesses the provided at least one pixel conversion table to effectuate any necessary conversion during operation.

In one embodiment, the at least one pixel conversion table includes a first table for converting direct color pixels of one color depth to indexed color pixels of another color depth, and a second table for converting indexed color pixels between two color depths.

In one embodiment, a table generation function is also provided for generating the desired conversion tables.

In one embodiment, the application is a remote control service application. The remote control service application in a sender system accesses an appropriate one of locally provided conversion table(s) to convert each pixel of each display screen before transmitting the display screen to a remote recipient. The conversion and transmission are performed responsive to an interrupt.

BRIEF DESCRIPTION OF DRAWINGS

The present invention will be described by way of exemplary embodiments, but not limitations, illustrated in the accompanying drawings in which like references denote similar elements, and in which:

FIGS. 2A–2B illustrate two exemplary pixel conversion tables;

FIG. 5 illustrates one embodiment of the present invention.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
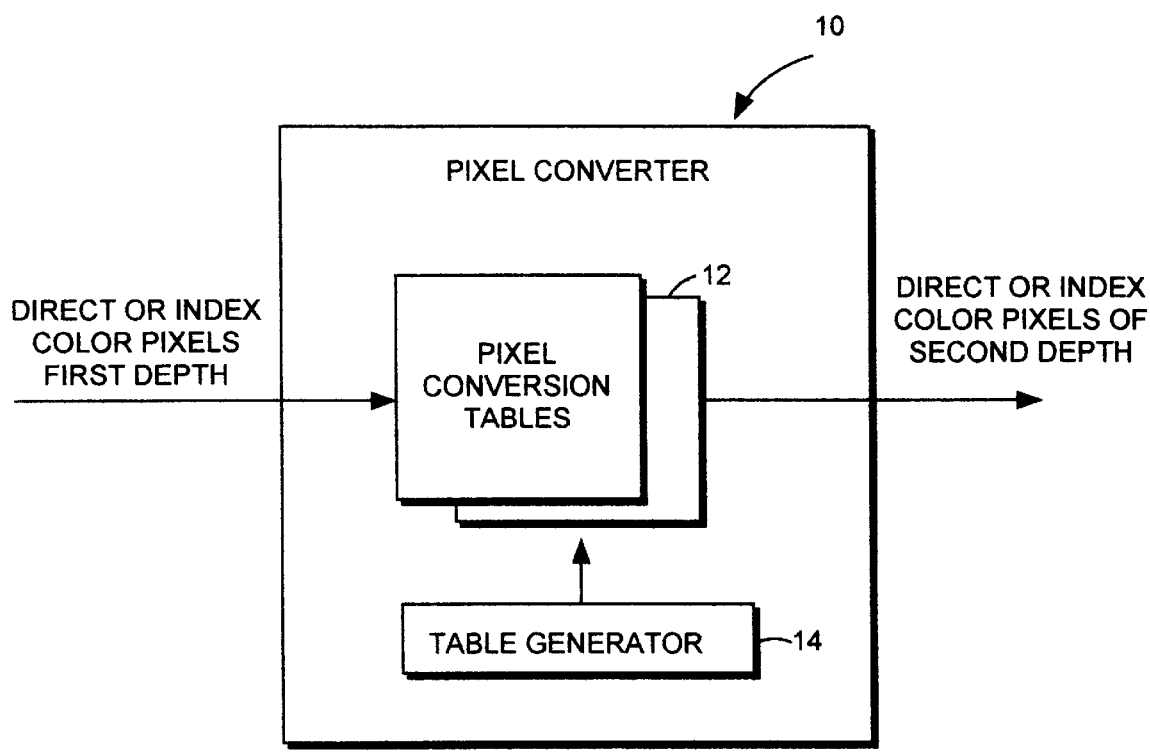
FIG. 1 is a block diagram illustrating one embodiment of the pixel converter of the present invention for converting pixels between color depths.

Referring now to FIG. 1, wherein a block diagram illustrating one embodiment of the pixel converter of the present invention is shown. For the illustrated embodiment, pixel converter 10 comprises a plurality of pixel conversion tables 12 for converting pixels from one color depth to another color depth. Each table 12 comprises a plurality of conversion entries mapping colors of one color depth to colors of another color depth, e.g. an 8-bit shade of the color orange to a 4-bit shade of the color orange. In one embodiment, tables 12 include tables for converting direct color pixels of one color depth to index color pixels of another color depth, e.g. 16-bit direct color pixels to 8-bit index color pixels, as well as tables for converting indexed color pixels from one color depth to another color depth, e.g. 8-bit indexed color pixels to 4-bit indexed color pixels.

FIGS. 2A–2B illustrate one each of these two types of conversion tables. Table 12a of FIG. 2A comprises of a number of conversion entries mapping 16-bits RGB colors to 8-bit color indices, whereas table 12b of FIG. 2B comprises of a number of conversion entries mapping 8-bit color indices to 4-bit color indices. Those skill in the art will appreciate that tables for converting other combinations of pixel types and/or other combinations of color depths may also be included.

Referring briefly back to FIG. 1, for the illustrated embodiment, pixel converter 10 also includes table generator 14 for generating conversion tables 12. In one embodiment, table generator 14 generates the various mapping entries of the various tables using the above described Euclidean Distance Formula. For an RGB to RGB mapping entry, table generator 14 determines the appropriate RGB value in the second color space applying the formula. For an RGB to index mapping entry, table generator 14 additionally looks up the index value for the determined RGB value in the second color space. Finally, for an index to index mapping entry, table generator 14 performs the pre-determination look-up as well as the post determination look-up.

In one embodiment, where pixel converter 10 is packaged as a standalone utility, table generator 14 generates tables 12 when invoked. In an alternate embodiment, where pixel converter 10 is packaged as an integral part of an application, table generator 14 is invoked to generate tables 12 during an initialization phase of the application. Other manners of packaging and/or other manners of invocation may be employed.

While the present invention is being described with the embodiment illustrated in FIG. 1, including table generator 14, those skilled in the art will appreciate that the present invention may be practiced without including table generator 14 as an integral part of pixel converter 10. Pixel converter 10 (without table generator 14) may be distributed with tables 12 pre-generated prior to distribution, employing table generator 14.

Figure 3:
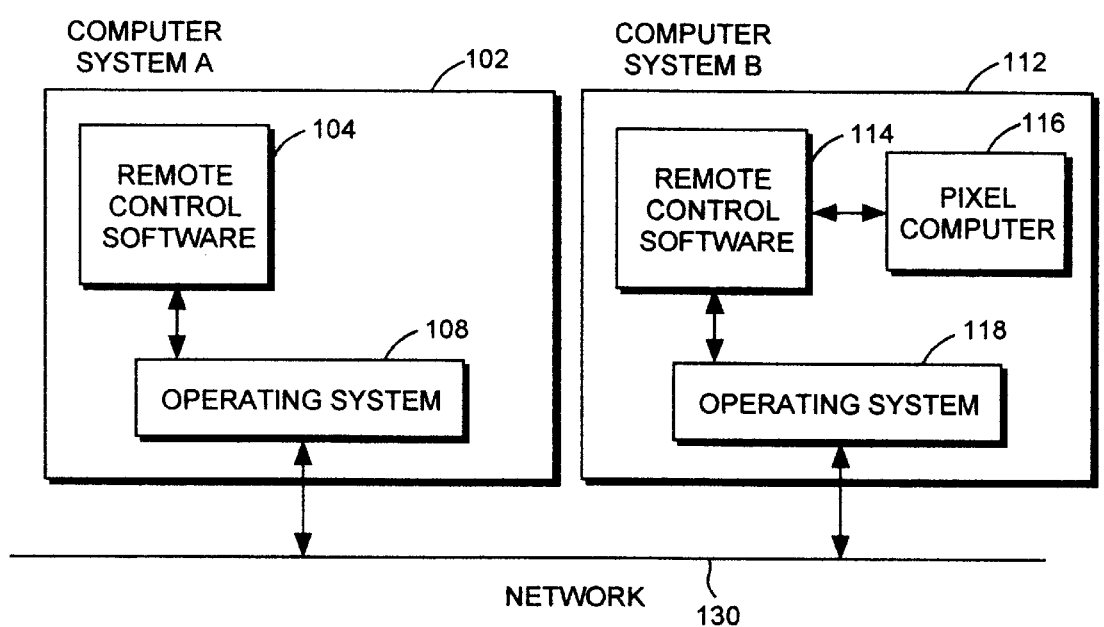
FIG. 3 illustrates one exemplary application of the present invention.

Referring now to FIG. 3, wherein one exemplary application of the present invention is illustrated. As shown, computer systems 102 and 112 are equipped with remote control software 104 and 114 for a remote control service application. Computer systems 102 and 112 also include operating systems 108 and 118 respectively, and the systems are coupled to each other through network 130. More importantly, in accordance with the present invention, computer systems 112 is equipped with pixel converter 116, to allow the remote control service application to be implemented with computer systems 102 and 112 operating with different color space, and independent of the operating systems' pixel conversion limitations.

Remote control software 104 and 114 cooperatively reflect the inputs and displays of one computer system on the other computer system. In other words, inputs to computer system 102 are automatically forwarded to computer system 112 as if they are entered locally through input devices on computer system 112. Likewise, displays rendered on computer system 112 are automatically forwarded to computer system 102 for rendering. Thus, a user at computer system 102 can remotely control computer system 112.

In accordance with the present invention, remote control software 114 accesses an appropriate one of the local pixel conversion tables 116 to convert pixels of a display screen, before sending the display screen to its counterpart. In one embodiment, pixels of the display screen are 16-bit direct color pixels, and they are converted to 4-bit index color pixels. In one embodiment, the conversion and sending of the display screen are performed, responsive to an interrupt. At such time, the operating system's pixel conversion service is rendered inaccessible.

Except for the above described manner of cooperating with pixel converters 106 and 116, remote control software 104 and 114 are otherwise intended to represent a number of remote control software known in the art, e.g. LANDesk Management Suite and LANDesk Workgroup Manager, available from Intel Corp. of Santa Clara, assignee of the present invention. Similarly, operating systems 108 and 118 are also intended to represent any number of operating systems known in the art, e.g. MacOS referred to earlier, and Windows 3.1, '95 as well as NT available from Microsoft Corp. of Redmond, Wash.

In summary, as a result of the innovative employment of the pixel converter of the present invention, the above exemplary remote control service application may be practiced independent of the operating system's pixel conversion service limitation. Additionally, those skilled in the art will appreciate that pixel conversion under the present invention is significantly faster than pixel conversion under the prior art, as accessing the pre-generated mapping entries can be performed in significantly shorter amount of time than what is required to determine the closest color in the other color space in real time using the Euclidean Distance Formula. Furthermore, under the present invention, the pixel conversion process may be optimized, as the application has greater control over the process.

While the exemplary application illustrated by FIG. 3 involves only the sending system performing the pixel conversion in accordance with the teachings of the present invention, those skilled in the art will also appreciate that in alternate applications, the receiving system may also perform pixel conversion in accordance with the teachings of the present invention, prior to rendering the received pixel data.

Skipping now to FIG. 5, one embodiment of the present invention is described. In step 510, a pixel color conversion table is pre-stored. As discussed above, table generator 14 can generate the table using the Euclidean Distance Formula to the determine a closest RGB value in the second color space for each table entry from the first color space. In step 520, the pixel color conversion table is accessed to convert pixels of a display screen from the first color space to the second color space. As discussed above with respect to FIG. 3, a display screen may be converted by a remote control computer system from a color space on the remote control computer system to a color space on a recipient computer system before sending the display screen to the recipient in step 530. Alternately, if the display screen is received from a remote computer in one color space, the display screen can be converted to a local color space before being rendered locally in step 530.

Figure 4:
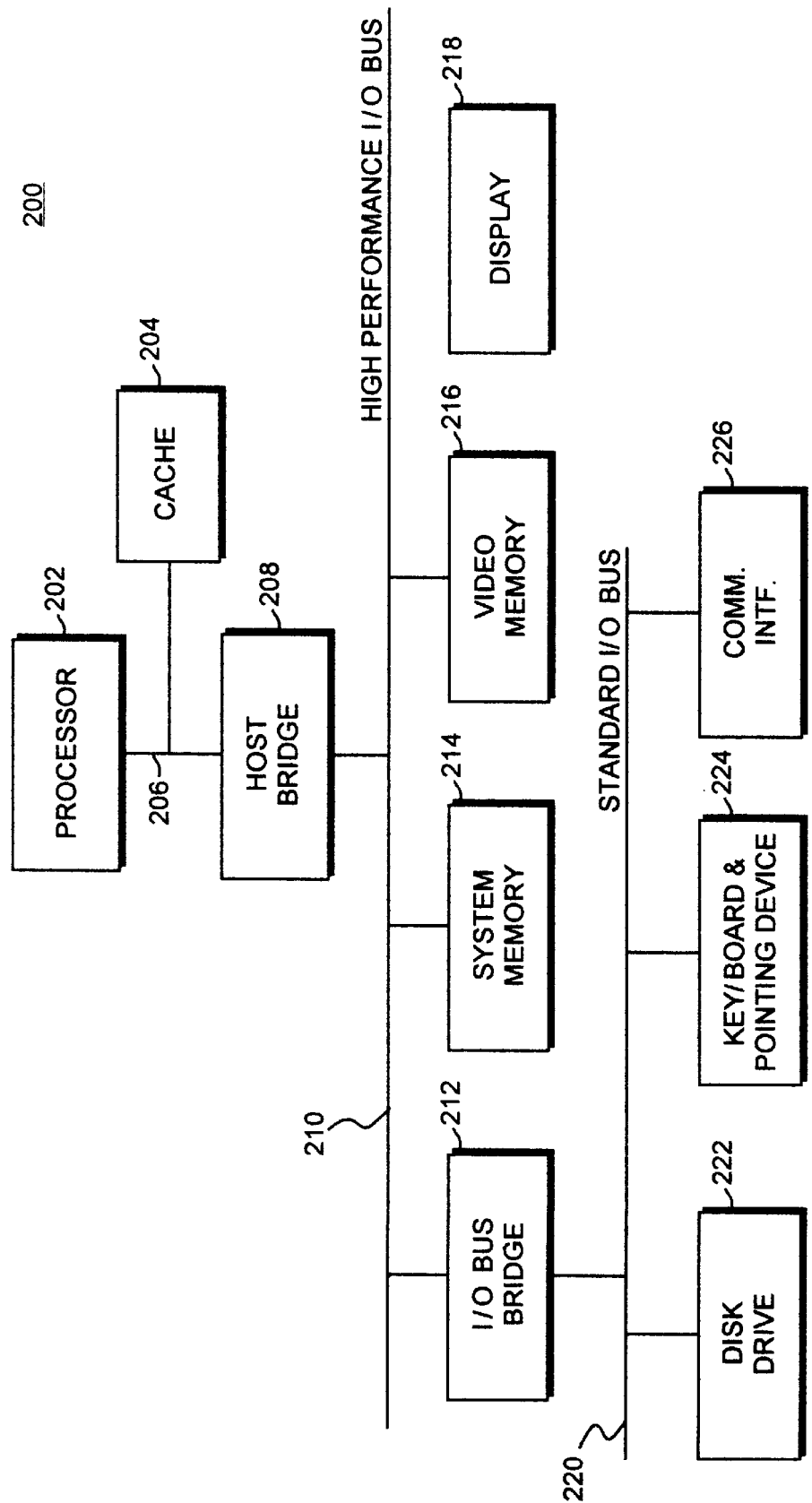
FIG. 4 illustrates one embodiment of a computer system suitable for programming with the present invention.

FIG. 4 illustrates one embodiment of a computer system suitable for practicing the present invention. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus 206 is cache 204. Coupled to high performance I/O bus 210 are system memory 214 and video memory 216, to which video display 218 is coupled. Coupled to standard I/O bus 220 are disk drive 222, keyboard and pointing device 224 and communication interface 226.

These elements perform their conventional functions known in the art. In particular, disk drive 222 and system memory 214 are used to store a permanent and a working copy of the pixel converters of the present invention, and programming instructions of applications that access the pixel converters in accordance with the teachings of the present invention, when executed by processor 202. The permanent copy may be pre-loaded into disk drive 222 in factory, loaded from a distribution medium (not shown), or down loaded from on-line/networked distribution source (not shown). The constitutions of these elements are known. Any one of a number of implementations of these elements known in the art may be used to form computer system 200.

Of course, computer systems of alternate constitutions, including computer systems of alternate architectures may also be employed to practice the present invention.

In general, those skilled in the art will recognize that the present invention is not limited by the details described, instead, the present invention can be practiced with modification and alteration within the spirit and scope of the appended claims. The description is thus to be regarded as illustrative instead of restrictive on the present invention.

Thus, a methodology for converting pixels between different color depths, including its applications and apparatuses incorporated with the methodology have been described.

What is claimed is:

1. An apparatus comprising
   (a) a storage medium having stored therein (i) at least one pixel color conversion table for converting pixel colors from a first color space having a first color depth to a second color space having a second color depth, each of the at least one pixel color conversion table comprising multiple pixel color conversion entries, each entry to map a pixel color of the first color space to a pixel color in the second color space which is closest to the pixel color of the first color space, and (ii) a first plurality of programming instructions to access the at least one pixel color conversion table during execution as a secondary pixel conversion service to convert pixel colors from the first color space to the second color space responsive to an interrupt during which a primary pixel conversion service is rendered inaccessible; and
   (b) an execution unit coupled to the storage medium to execute the programming instructions.

2. The apparatus as set forth in claim 1, wherein the first color space comprises direct color pixels.

3. The apparatus as set forth in claim 1, wherein the first color space comprises indexed color pixels.

4. The apparatus as set forth in claim 1, wherein the storage medium further having stored therein a second plurality of programming instructions that populate the at least one pixel color conversion table during execution.

5. The apparatus as set forth in claim 1 wherein the first plurality of programming instructions comprises:
   a remote control service application to access the at least one pixel color conversion table to convert pixel colors of a display screen in the first color space on a first computer system to the second color space before sending the display screen to another computer system.

6. The apparatus as set forth in claim 1 wherein the first plurality of programming instructions comprise:
   a remote control service application to access the at least one pixel color conversion table to convert pixel colors of a display screen received from a remote sender from the first color space to the second color space before rendering the display screen.

7. The apparatus of claim 1 wherein the interrupt comprises an interrupt for remote control service.

8. The apparatus of claim 1 wherein the interrupt prevents access to an application program interface (API) of the primary pixel conversion service.

9. The apparatus of claim 1 wherein the primary pixel conversion service is to calculate pixel conversions in real time based on a formula.

10. A method comprising:
    (a) pre-storing at least one pixel color conversion table for converting pixel colors from a first color space having a first color depth to a second color space having a second color depth, each of the at least one pixel color conversion table comprising multiple pixel color conversion entries, each entry to map a pixel color of the first color space to a pixel color in the second color space which is closest to the pixel color of the first color space; and
    (b) accessing the at least one pixel color conversion table as a secondary pixel conversion service to convert pixel colors from the first color space to the second color space responsive to an interrupt during which a Primary pixel conversion service is rendered inaccessible.

11. The method as set forth in claim 10, wherein the first color space comprises direct color pixels.

12. The method as set forth in claim 10, wherein the first color space comprises indexed color pixels.

13. The method as set forth in claim 10, wherein the at least one pixel color conversion table comprises
    a local pixel color conversion table to convert pixel colors of a local screen display from the first color space to the second color space; and wherein the method further comprises sending the converted local screen display to a remote recipient.

14. The method as set forth in claim 10 wherein the at least one pixel color conversion table comprises a local pixel color conversion table to convert pixel colors of a screen display received from a remote sender from the first color space to the second color space; and wherein the method further comprises locally rendering the converted screen display.

15. A machine readable storage medium having stored thereon:

(a) at least one pixel color conversion table for converting pixel colors from a first color space having a first color depth to a second color space having a second color depth, each of the at least one pixel color conversion table comprising multiple pixel color conversion entries, each entry to map a pixel color of the first color space to a pixel color in the second color space which is closest to the pixel color of the first color space; and (b) a first plurality of programming instructions to access the at least one pixel color conversion table during execution as a secondary Pixel conversion service to convert pixel colors from the first color space to the second color space responsive to an interrupt during which a primary pixel conversion service is rendered inaccessible.

16. The storage medium as set forth in claim 15, wherein the first color space comprises direct color pixels.

17. The storage medium as set forth in claim 15, wherein the first color space comprises indexed color pixels.

18. The machine readable storage medium as set forth in claim 15 further having stored thereon:

(a) a second plurality of programming instructions that when executed, initialize the at least one pixel color conversion table.

\* \* \* \* \*